UNITED STATES PATENT OFFICE.

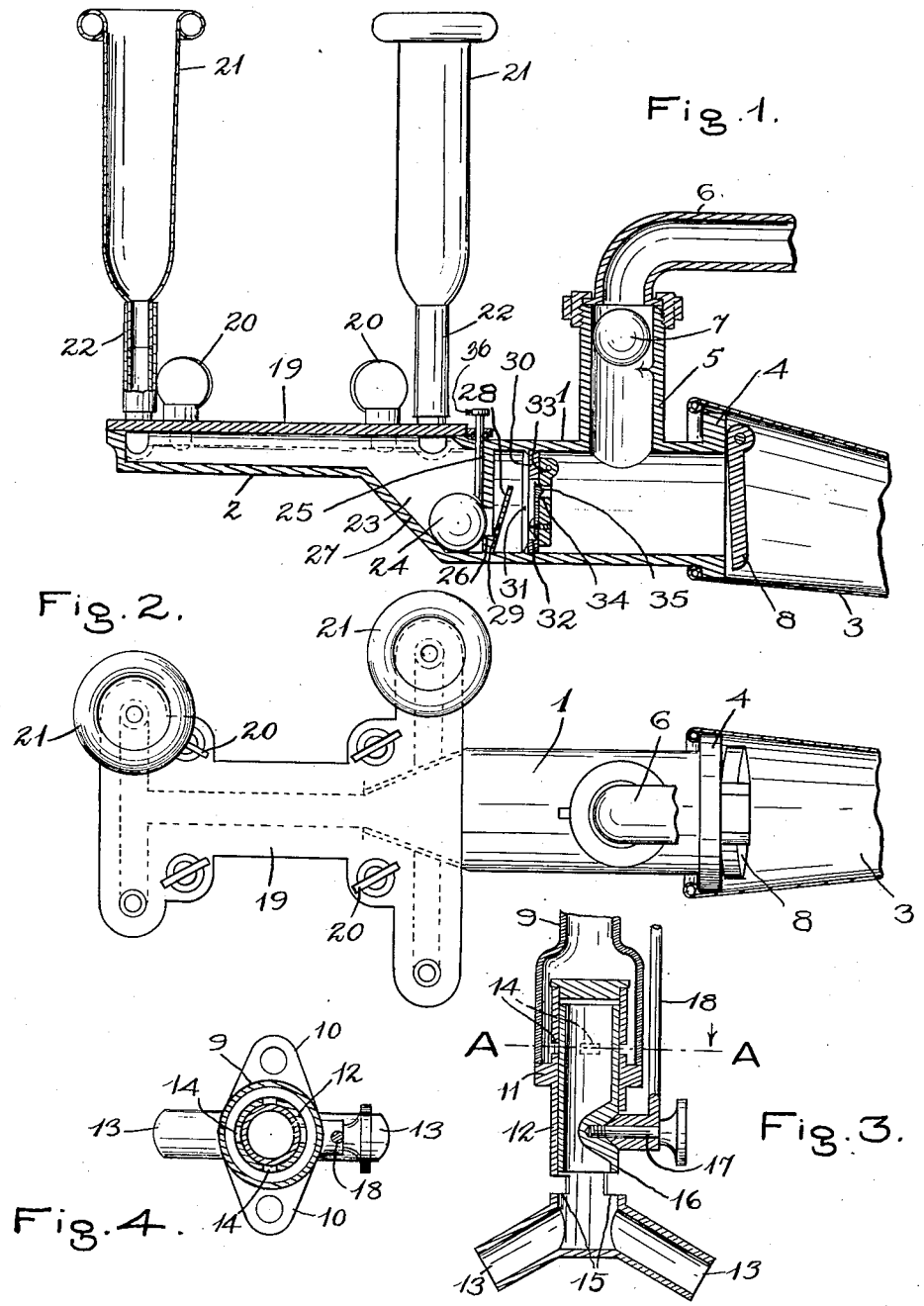

OSCAR ANDERSON, OF CHICAGO, ILLINOIS.

MILKING-MACHINE.

1,118,258.  Specification of Letters Patent.  Patented Nov. 24, 1914.

Application filed June 21, 1911. Serial No. 634,400.

*To all whom it may concern:*

Be it known that I, OSCAR ANDERSON, a citizen of the United States, residing at Chicago, in the county of Cook and State of Illinois, have invented certain Improvements in Milking-Machines, of which the following is a specification.

The present invention relates to certain new and useful improvements in the design and construction of pneumatic milking machines of that type in which a pulsating suction is caused to act upon the teats of the cow for the purpose of drawing the milk therefrom.

The object of the invention is the provision of a milking machine of this character which is comparatively simple and inexpensive in its construction, which can be readily maintained in a clean and sanitary condition, and which will automatically stop its operation when all of the milk has been exhausted from the cow.

With these and other objects in view, as will more fully appear as the description proceeds, the invention consists in certain novel constructions and arrangements of the parts, the novel features being pointed out in the appended claims.

For a full understanding of the invention reference is to be had to the accompanying drawings in which:—

Figure 1 is a vertical longitudinal sectional view through a milking machine constructed in accordance with the invention, the pulsator being removed. Fig. 2 is a top plan view of the same. Fig. 3 is a vertical longitudinal sectional view through the pulsator, and Fig. 4 is a transverse sectional view through the pulsator on the line A—A of Fig. 3.

Corresponding and like parts are referred to in the following description and indicated in all the views of the drawing by like reference characters.

Referring to the drawing, upon which is illustrated one embodiment of the invention, the numeral 1 designates the main casing which is provided at one end thereof with an extension 2, and has a discharge spout 3 detachably connected to a flange 4 upon the opposite end. A lateral arm 5 projects upwardly from an intermediate portion of the main casing and has a pipe 6 connected to the end thereof, the said pipe leading to some suitable form of pulsator such as is illustrated by Fig. 3. A float valve 7 is arranged within this lateral arm 5 so as to close the end of the pipe 6 and prevent any milk from entering the said pipe should the level of the milk rise within the casing so as to enter the lateral arm.

The outflow of milk from the casing is controlled by a flap valve 8 which is properly balanced so as to normally assume a slightly open position, as indicated in Fig. 1. With this construction, it will be apparent that when a partial vacuum is produced within the main casing the flap valve 8 will be closed by atmospheric pressure, while when the interior of the casing is in communication with the outer atmosphere, the flap valve 8 will open and permit any milk which may have accumulated within the casing to pass through the discharge spout into some suitable open receptacle provided for receiving the same.

Referring to Figs. 3 and 4, which serve to illustrate the pulsator, the numeral 9 designates the suction pipe which may be placed in communication with any suitable form of suction producing machine. The end of this suction pipe is formed with flanges 10 whch are detachably connected by some suitable fastening member to a flange 11 upon the casing 12 of the pulsator valve. This valve casing 12 has a tubular formation and is provided at the lower end thereof with a pair of branches 13, the upper end of the casing being formed with openings 14 communicating with the suction pipe 9 and air inlet openings 15 being provided in the sides of the casing toward the bottom thereof. The pulsator valve 16 has a tubular construction and is slidably mounted within the casing 12, the said valve being detachably connected by means of a thumb screw 17 with the lower end of a pitman 18. When the pulsator valve is at the upper limit of its movement, as indicated in Fig. 9, the suction openings 14 are closed and the air inlet openings 15 opened, thereby placing the casings 1 of the milking machines in communication with the outer atmosphere. On the contrary, it will be apparent that when the pulsator valve reaches the lower limit of its movement the suction openings 14 will be uncovered and the air inlet openings 15 closed, thereby placing the casings 1 of the milking machines in communication with the suction pipe 9 and causing partial vacuums to be produced therein. Any suitable form of motor may be connected to the pitman 18 for reciprocating the pulsator valve up and down and throwing the casings 1 alternately into communication with the suction pipe 9 and the outer atmosphere.

The extension 2 of the main casing has a hollow formation and is closed at the top thereof by means of a removable plate 19. Any suitable means such as the thumb screws 20 may be employed for holding the plate in position, and the said plate is formed with a number of nipples upon which the teat cups 21 are mounted, the usual rubber sleeves 22 being utilized for securing a flexible connection between the said members. A pocket 23 is provided at the inner end of the hollow extension 2, and a spherical float valve 24 is arranged within this pocket. It will also be observed that an integral partition 25 is provided at the junction of the main casing 1 and the extension, the said partition being provided toward the bottom thereof with an opening 26 which is designed to be closed by the valve 24 when it rests upon the bottom of the pocket 23, the inclined wall 27 of the pocket tending to hold the valve against the opening. It will thus be apparent that as long as the pocket 23 is filled with milk the float valve will remain at the top of the pocket and will not interfere in any manner with the flow of milk through the opening 26, but that as soon as the pocket becomes empty the float valve will close the opening 26 and thereby prevent the pulsating action of the milker from being transferred to the teat cups. An inclined partition extends upwardly from the bottom of the opening 26 to a point above the top thereof, extending across the interior of the casing for its lower part on the opposite side of the partition 25 from the pocket 23, and a drain opening 29 is provided at the lower portion of this partition. As long as the pocket 23 is full of milk, the said milk will flow over the top of the inclined partition 28 as fast as milk is drawn from the cow, but as soon as the cow ceases to give milk, the supply of milk remaining in the pocket will soon drain through the small opening 29 and cause the valve 24 to close the opening 26. In this manner the milking machine will be automatically stopped as soon as the pulsating action ceases to draw milk from the teats. A removable partition 30 is also fitted within the casing 1, the said partition bearing against an annular shoulder 31. An opening 32 is formed in this removable partition, and a flap valve 33 is provided for closing this opening, the said flap valve opening away from the teat cups so as to maintain a partial vacuum continuously within the same. It will be observed, however, that a perforation 34 is provided in the flap valve 33 and that this perforation is normally closed by means of a spring valve 35 opening toward the teat cups, the tension of the spring serving to determine the pressure of the vacuum which will be maintained in the teat cups between the pulsations of the machine. A sufficient vacuum would thus be maintained at all times to retain the teat cups in proper position, although should some means such as straps be employed for holding the teat cups in position, the valves 33 and 35 might be omitted.

In the operation of the device, it will be apparent that the pulsator will act to throw the casing 1 alternately in communication with the suction pipe 9 and the atmosphere, and that the milk drawn from the teats by the partial vacuums will be discharged through the spout 3 when the casing is in communication with the atmosphere. Furthermore, a sufficient vacuum will always be maintained within the teat cups to hold the same in position, and the action of the milker will be automatically stopped as soon as the teats cease to give milk. It will, of course, be understood that when first starting the milker the float valve 24 would be held away from its seat by lowering a plunger 36, so that a partial vacuum could be formed in the hollow extension 2, and after the milk has commenced to flow sufficiently to float the said valve 24 the plunger would be drawn up again out of the way. No further attention would then be necessary until after the milking operation had been completed and the valve 24 had again reached the bottom of the pocket and closed the opening 26.

Having thus described the invention, what I claim is:

1. A milking machine including a teat cup, a pulsating suction apparatus in communication with said teat cup through an opening, and a float valve for said opening adapted to be held open by the flow of milk and to close when the flow of milk stops.

2. A milking machine including a teat cup, a pulsating suction apparatus in communication with said teat cup through an opening, and a float valve for said opening at the side thereof away from the pulsating suction apparatus and adapted to be held open by the flow of milk through said opening and to close by gravity when such flow stops to cut off communication of the suction with the teat cup.

3. A milking machine including a teat cup, a pulsating apparatus in communication with the teat cup, a casing arranged between the pulsating apparatus and the teat cup and formed with a pocket having a drain opening at the bottom thereof, a float arranged within the pocket, and means cooperating with the float to automatically shut off communication between the pulsating apparatus and the teat cup as soon as milk is drained from the pocket.

4. A milking machine including a teat cup, a pulsating apparatus in communication with the teat cup, a casing arranged between the pulsating apparatus and the teat cup and formed with a pocket and a partition extending across the interior of the casing at one side thereof, the said partition being provided with an opening and an overflow partition at its side away from the pocket which extends upwardly above the opening, a drain opening being provided at the bottom of the overflow partition, and a float valve within the pocket, the said float valve automatically closing the opening in the partition as soon as the cow ceases to give milk and the milk within the pocket is drained through the opening in the overflow partition.

5. A milking machine including a teat cup, a pulsating apparatus in communication with the teat cup, a casing arranged between the pulsating apparatus and the teat cup and formed with a pocket, one side of the pocket being inclined while a partition having an opening therein is provided at the opposite side of the pocket, and a float valve arranged within the pocket, the said float valve being deflected inwardly by the inclined wall of the pocket so as to close the opening in the partition and shut off communication between the pulsating apparatus and the teat cup as soon as the cow ceases to give milk and the milk within the pocket is drained therefrom.

6. A milking machine including a teat cup, a pulsating apparatus in communication with the teat cup, a casing interposed between the teat cup and the pulsating apparatus, a check valve mounted within the casing and opening toward the pulsating apparatus so as to maintain a partial vacuum within the teat cup, a spring-closed valve mounted upon the check valve and opening toward the teat cup so as to regulate the pressure of the said partial vacuum, and an inwardly opening check valve adapted to float away from its seat between said first-mentioned check valve and the teat cup.

7. A milking machine including a teat cup, a pulsating apparatus, a casing arranged between the teat cup and pulsating apparatus, a removable partition inserted within the casing and having an opening therein, a check valve mounted upon the partition for closing the opening, the said check valve opening toward the pulsating apparatus and serving to maintain a partial vacuum within the teat cup, and a secondary valve applied to the check valve and opening toward the teat cup, the said secondary valve being held yieldingly upon its seat and serving to regulate the pressure of the partial vacuum maintained within the teat cup.

8. A milking machine including a teat cup, a pulsating apparatus, a casing interposed between the teat cup and pulsating apparatus, means within the casing for retaining a partial vacuum within the teat cup, and means within the casing for automatically shutting off communication between the pulsating apparatus and the teat cup as soon as the cow ceases to give milk.

9. A milking machine including a casing formed with a milk inlet and a milk outlet, a pulsating apparatus in communication with the casing, and an outwardly opening check valve for the milk outlet, the said check valve normally assuming a partially open position.

10. A milking machine including a main casing formed with a milk inlet and a milk outlet, a valve controlling the milk outlet, a pulsating apparatus in communication with the casing, and means for preventing the milk from reaching the pulsating apparatus.

11. A milking machine including a main casing formed with a milk inlet and a milk outlet and also provided with an upwardly extending lateral arm, a valve controlling the milk outlet, a pulsating apparatus in communication with the upwardly extending arm, and a float valve arranged within the said upwardly extending arm for preventing milk from reaching the pulsating apparatus.

12. A milking machine including a main casing formed with a hollow extension, a removable plate closing the top of the hollow extension, a teat cup mounted upon the removable plate, and a pulsating apparatus in communication with the casing.

13. A milking machine including a main casing provided at one end thereof with a milk outlet and at the opposite end thereof with a hollow extension, a pocket with a drain opening at the bottom thereof being provided at the inner end of the extension, a removable plate closing one side of the hollow extension, a teat cup carried by the removable plate, a valve controlling the milk outlet, a pulsating apparatus in communication with the main casing, a float within the before mentioned pocket, and means coöperating with the float to shut off communication between the main casing and the extension as soon as the cow ceases to give milk and the pocket is drained.

14. In a milking machine, a milk chamber having an outlet, means for intermittently producing suction in said milk chamber, teat cups connected directly with said milk chamber, and a hinged valve for the outlet of said milk chamber adapted to normally open and to be closed by the suction.

15. In a milking machine, a milk chamber having a milk outlet, means for producing intermittent suction in said milk chamber, teat cups connected directly to said milk chamber, a hinged valve for the said milk chamber outlet adapted to normally open and to be closed by the suction, and means for preventing milk from being drawn out of the milk chamber by suction.

16. In a milking machine, a milk chamber having an outlet, means for intermittently producing suction in said milk chamber, teat cups connected directly to said milk chamber, a hinged valve adapted to close the said outlet of the milk chamber under suction therein, and means for preventing milk from being drawn out of the milk chamber by such suction.

17. In a milking machine, a milk chamber having an outlet, means for producing intermittent suction in said milk chamber, teat cups connected to said milk chamber, and a hinged valve for said outlet of the milk chamber adapted to hang slightly open by gravity and to be closed by suction in the milk chamber.

OSCAR ANDERSON.

Witnesses:
MARY F. ALLEN,
GEO. T. MAY, Jr.